United States Patent Office 2,816,939
Patented Dec. 17, 1957

2,816,939

DEHYDROISOMERIZATION OF C₅-RING NAPHTHENES

Kenzie Nozaki, El Cerrito, Calif., assignor to Shell Development Company, Emeryville, Calif., a corporation of Delaware No Drawing. Application June 23, 1953
Serial No. 363,657

5 Claims. (Cl. 260—668)

This invention relates to the dehydroisomerization of methyl substituted naphthenic hydrocarbons having $C_5$-rings with a particulate catalyst and under selected conditions of operation to give directly the corresponding aromatic hydrocarbons with a minimum of ring splitting and cracking into smaller hydrocarbon fragments.

It is well known that the naphthenic hydrocarbons having $C_6$-rings can be easily and quite selectively dehydrogenated to the corresponding aromatic hydrocarbons with good conversion and yields. The naphthenes having $C_5$-rings, on the other hand, cannot be so converted. In the first place, they are much more susceptible to cracking. Their presence in the dehydrogenation of $C_6$-ring naphthenes, therefore, leads to cracking and fouling of the catalyst and, for this reason, it is desirable to remove them from feed stocks containing them. This is shown in Hoog patent—U. S. 2,288,866. In the second place, the reaction of the $C_5$-ring naphthenes to aromatics is not a simple dehydrogenation. Thus, the dehydrogenation of $C_5$-ring naphthenes and $C_6$-ring naphthenes with platinum catalysts has been extensively investigated with the conclusion that the reaction is sufficiently specific to the $C_6$-ring naphthenes to be useful as an analytical tool for determining the concentration of $C_6$-ring naphthenes in the presence of $C_5$-ring naphthenes. See Zelinsky et al., Ber. 56B 2463 (1923), Ber. 66 1419 (1933), Ber. 68 1869 (1935) and Ber. 69 1862 (1936).

It was later found that $C_5$-ring naphthenes can be converted directly to aromatic hydrocarbons with certain specific catalysts but the process is far from selective. Thus, for example, it has been shown by Fuller et al., U. S. 2,378,210 that a moderate conversion can be obtained with certain molybdena-alumina catalysts. Trimble, U. S. 2,414,620 shows that tungsten sulfide-nickel sulfide catalyst containing a quite high and specific proportion of nickel likewise gives a fair conversion for a time when using freshly prepared catalyst. Ciapetta, U. S. 2,550,531, infers that the reaction takes place in his hydroforming process using a special catalyst prepared by substantially deactivating a silica-alumina cracking catalyst to a surface of 10 to 65 square meters per gram and then incorporating about three tenths percent platinum. There is, however, no showing of the reaction from which it can be concluded that the conversion is any more selective than in the previously mentioned reforming processes. Also, since the reaction rate is approximately proportional to the available surface of the catalyst, it is evident that the reaction rate is relatively slow. It is pointed out and demonstrated that if the surface is not so reduced prior to incorporating the platinum, excessive cracking, even for a reforming operation, takes place.

In the process of my invention $C_5$-ring naphthenes having methyl groups, e. g., methyl cyclopentane, dimethyl cyclopentane, trimethyl cyclopentane, methyl indane, dimethyl indane, and the like, are effectively and efficiently converted to the corresponding aromatic hydrocarbons by treating them under selected conditions of operation with a special particulate catalyst which has a high surface area and, consequently, a high activity and, at the same time, gives little splitting of the naphthene rings and little cracking to lighter cracked products and carbonaceous deposits. The catalyst normally has a surface well above 300 meters square per gram and consists essentially of silica in combination with certain critical and low concentrations of alumina and platinum. It is found that efficient conversion of the $C_5$-ring naphthenes with the high surface catalyst is possible provided that the concentration of alumina is carefully adjusted. This will be illustrated in the examples.

The $C_5$-ring naphthene to be converted may be a single compound such as mentioned above or a mixture of such compounds, or it may be in a mixture with hydrocarbons of other types. Thus, the process is applicable for the conversion of technically pure compounds or hydrocarbon fractions containing substantial amounts of such $C_5$-ring naphthenes. The naphthene hydrocarbon feed is vaporized and the vapors are passed in contact with the catalyst along with from 1 to about 12 moles of hydrogen per mole of hydrocarbon. This required hydrogen may be supplied from an exterior source but is preferably supplied by recycling part of the product gas which consists largely of hydrogen. The reaction may be effected at temperatures between about 420° C. and about 570° C. and at pressures between about 5 and 1000 pounds per square inch absolute.

The reaction is best carried out by passing the vapors through a fixed bed of the catalyst in a suitable reaction vessel which may advantageously be provided with means for heating the catalyst bed and/or heating the reactant vapor stream between sections of the catalyst bed. The catalyst may be in the form of granules produced by crushing or in the form of formed pellets. The process can, however, with suitable modification also be carried out with the catalyst in powdered form.

The operation may be carried out continuously for hundreds of hours without regenerating the catalyst. In cases where relatively drastic conditions within the above ranges are chosen, the catalyst may decline in activity at a slow rate during use. In such cases, it is advantageous to periodically stop the flow of the hydrocarbon while continuing the passage of the diluent gas. By this means a single charge of the catalyst can be used for a long period of time before it finally becomes spent. In some cases, after a long period of use, it may be desirable to regenerate the catalyst by burning off the small amount of carbonaceous deposits which collect. Normally, however, the process is carried out continuously without any form of regeneration.

The alumina may be incorporated with the silica in various ways. One preferred method is to hydrolyze an aluminum salt in the presence of silica sol. Gelation is allowed to take place and after washing and drying the resulting gel, the platinum is incorporated by impregnation. The preferred method for preparing the catalyst is illustrated in more detail by the following.

An aqueous solution of two normal sodium disilicate is added with stirring over a two hour period to an aqueous solution two normal in hydrochloric acid and 0.014 molar in aluminum chloride until a pH of about 4.5 is reached. The silica concentration of the resulting sol is about 60 grams per liter. The sol is allowed to set to a hydrogel and the hydrogel is aged at room temperature. In the catalyst mentioned below, the hydrogel was aged for three days. A longer or shorter aging period may, however, be used. The aged gel is slurried with water, washed until virtually free of chloride ions, and then treated with a 3/10 molar solution of ammonium chloride until the sodium is substantially completely removed. Two 10 minute treatments with the ammonium chloride solution are generally efficient. The material is then thoroughly washed with water, filtered and dried, e. g., at 120° C. The resulting xerogel is then carefully wetted and then soaked in a substantially neutral solution of tetrammine platinous chloride containing about 0.12% platinum. Virtually all of the platinum is taken up by the gel. The catalyst is then washed with water until substantially free of chloride ion and then dried, e. g., at 120° C.

It is found that the catalyst prepared as just described does not have its optimum activity but that its optimum activity is obtained after a simple calcination in vacuum or in a dry atmosphere of nitrogen or hydrogen. The calcination should be effected at at least 500° C. when carried out in nitrogen or hydrogen but somewhat lower temperatures, e. g., 475° C. are effective when a vacuum is used. The preferred calcination temperature is between about 500° C. and 570° C., e. g., 535° C. The effect of the precalcination treatment of a typical catalyst prepared as described is illustrated in the following table where the relative activities of the catalysts for the conversion of methyl cyclopentane to benzene are shown.

Table I

| Calcination conditions | Relative activity of the catalyst |
| --- | --- |
| No calcination | Ca. 1.0 |
| 0.5 hour at 538° C. in hydrogen | 2.5 |
| 15 hours at 535° C. in hydrogen | 2.8 |
| 1.5 hours at 546° C. in hydrogen | 3.0 |
| 1.3 hours at 538° C. in hydrogen | 3.5 |
| 1 hour at 538° C. in nitrogen | 3.8 |
| 1.5 hours at 538° C. in nitrogen | 3.8 |
| 1.7 hours at 475° C. in vacuum | 3.8 |

The criticality of the concentration of the alumina in the catalyst is illustrated in the following comparable examples wherein catalysts prepared as above described, but containing different concentrations of alumina, were tested in the conversion of methyl cyclopentane (96.5% pure) under the following conditions:

Temperature _____ ° C__ 475
Pressure _____ p. s. i. g__ 300
Hydrogen to hydrocarbon mole ratio _____ 5

The results are tabulated in the following Table II.

| Catalyst | Percent weight | | LHSV | Relative activity after— | | Conversion efficiency | Percent decline in activity in 8 hours on stream |
| --- | --- | --- | --- | --- | --- | --- | --- |
| | Platinum | Alumina | | 1 hour on stream | 8 hours on stream | | |
| 784 B | 0.26 | 0.24 | 16.4 | 1.9 | 1.9 | 81 | 0 |
| 713 B | 0.21 | 0.63 | 16.4 | 6.4 | 4.8 | 83 | 25 |
| 785 B | 0.20 | 1.2 | 17.4 | 8.7 | 4.8 | 88 | 45 |
| 786 B | 0.22 | 4.1 | 18.6 | 3.4 | 0.7 | 81 | 79 |
| 531 A | 0.1 | Ca. 11 | 8.3 | 0.28 | | 65 | |
| 531 B | 0.2 | Ca. 11 | 8.3 | 0.28 | | 60 | |
| 531 C | 0.3 | Ca. 11 | 8.3 | 0.28 | | 66 | |
| A | 0.31 | | 8.0 | 1.0 | 1.0 | 59 | 0 |

In order to serve as a basis for comparison, the results obtained with certain prior known catalysts are also known. Catalyst A, arbitrarily assigned an activity rating of 1.0, was a commercial halogen-promoted platinum-alumina catalyst sold for use in the Platforming process. Catalysts 531A, B, and C were prepared in accordance with U. S. Patent No. 2,550,531 as follows:

A fresh commercial synthetic silica-alumina cracking catalyst, (ca 11% $Al_2O_3$) manufactured by the American Cyanamid Company, was steamed to reduce the available surface to 48 square meters per gram. This required steaming at 790° C. for 20 hours. The resulting base was impregnated with chloroplatinic acid to incorporate different amounts of platinum and then dried and calcined for about 1½ hours at about 538° C. in nitrogen.

All of the catalysts were used in the form of 16–28 mesh granules.

The surface area of the first four catalysts was about 750 square meters per gram. The surface area of catalyst A was about 200 square meters per gram. It will be noted that in the case of the high surface catalyst, it is essential that the alumina content be carefully adjusted. Thus, catalyst 784–B, where the concentrations of platinum and alumina were 0.26% and 0.24%, respectively, is approximately twice as active as the commercial catalyst and approximately six times as active as the low surface silica-alumina catalyst, affords approximately 20% improvement in the conversion efficiency, and is capable of converting methyl cyclopentane with no apparent decline in the activity. On the other hand, if the alumina concentration is increased to 0.63% (catalyst 713–B) appreciable cracking starts to take place and the catalyst loses 25% of its activity in 8 hours of use. If the alumina content is further increased, it is seen that the catalyst becomes deactivated at an even faster rate. When the catalyst contains these amounts of platinum, it is, therefore, seen that the alumina content must be below 0.63%. As will be shown in the following example, alumina concentrations up to about 0.63% are suitable, however, with larger concentrations of platinum.

A series of catalysts was prepared by combining 0.63% alumina with silica as described above, and then various amounts of platinum were applied as described. The catalysts in the form of 16–28 mesh granules were then tested for the conversion of methyl cyclopentane (96.5% pure) to benzene under the following conditions:

Temperature _____ ° C__ 475
Pressure _____ p. s. i. g__ 300
Hydrogen/hydrocarbon mole ratio _____ 5
Liquid hourly space velocity _____ 16.4

The results are shown in the following Table III.

| Catalyst | Percent platinum | Relative activity after— | | Conversion efficiency | Percent decline in activity in 8 hours on stream |
| --- | --- | --- | --- | --- | --- |
| | | 1 hour on stream | 8 hours on stream | | |
| A | 0.31 | 1.0 | 1.0 | 59 | 0 |
| 713-J | 0.11 | 2.0 | 1.0 | 85 | 50 |
| 713-B | 0.21 | 6.4 | 4.8 | 88 | 25 |
| 713-C | 0.33 | 6.4 | 6.4 | 86 | 0 |
| 713-L | 0.48 | 7.1 | | 87 | |
| 713-F | 1.18 | 6.5 | 7.0 | 74 | −8 |

It will be seen from the above results that with concentrations of platinum of 0.33% or above an alumina content of 0.63% may be used.

The concentration of platinum in the catalyst used in the process of the present invention may range from about 0.1% up to about 1%. However, concentrations of 0.1% to 0.5% are preferred because such concentrations produce catalysts which are substantially as active as those having higher concentrations and are considerably less costly. The concentration of alumina may range from about 0.1% up to about 0.8%. However, the preferred concentrations are between 0.2% and 0.5%, and the higher concentrations are only recommended when the platinum concentration is at least 0.3% since the activity of the catalyst declines rapidly when higher concentrations of alumina are used with platinum concentrations in the lower preferred range.

I claim as my invention:

1. Process for the conversion of $C_5$-ring naphthenes to their corresponding aromatic hydrocarbons which comprises contacting a $C_5$-ring naphthene having at least one methyl group with a catalyst having a surface area above 300 square meters per gram and consisting of silica gel promoted with from 0.1 to 0.8% by weight alumina and from 0.1 to about 1% by weight platinum in the presence of added hydrogen and at a temperature between 420° C. and 570° C., said percentages of alumina and platinum being based on the catalyst and being correlated such that when the alumina is above 0.63% the platinum is at least 0.33% and when the alumina is below 0.63% the platinum is below 0.33%.

2. Process for the conversion of $C_5$-ring naphthenes to their corresponding aromatic hydrocarbons which comprises contacting a $C_5$-ring naphthene having at least one methyl group with a catalyst having a surface area of at least about 300 square meters per gram and consisting of silica gel promoted with from 0.2 to 0.5% by weight alumina and from 0.1 to 0.5% by weight platinum, said percentages being based on the catalyst, in the presence of added hydrogen and at a temperature between 420° C. and 570° C.

3. Process for the conversion of methyl cyclopentane to benzene which comprises contacting technically pure methylcyclopentane with a catalyst having a surface area of at least about 300 square meters per gram and consisting of silica gel promoted with from 0.1 to 0.8% by weight alumina and from 0.1 to about 1% by weight platinum in the presence of added hydrogen and at a temperature between 420° C. and 570° C., said percentages of alumina and platinum being based on the catalyst and being correlated such that when the alumina is above 0.63% the platinum is at least 0.33% and when the alumina is below 0.63% the platinum is below 0.33%.

4. Process in accordance with claim 3, wherein the catalyst contains about 0.24% by weight alumina and about 0.26% by weight platinum.

5. Process for the conversion of dimethylcyclopentane to toluene which comprises contacting technically pure dimethylcyclopentane with a catalyst having a surface area of at least about 300 square meters per gram and consisting of silica gel promoted with from 0.1 to 0.8% by weight alumina and from 0.1 to about 1% by weight platinum in the presence of added hydrogen and at a temperature between 420° C. and 570° C., said percentages of alumina and platinum being based on the catalyst and being correlated such that when the alumina is above 0.63% the platinum is at least 0.33% and when the alumina is below 0.63% the platinum is below 0.33%.

References Cited in the file of this patent

UNITED STATES PATENTS

| | | |
|---|---|---|
| 2,550,531 | Ciapetta | Apr. 24, 1951 |
| 2,656,398 | De Vault | Oct. 20, 1953 |
| 2,723,947 | Oblad et al. | Nov. 15, 1955 |

OTHER REFERENCES

"Advances in Catalysis," Frankenberg et al., Academic Press Inc., N. Y., pp. 214 and 219 (1951).

Fowle et al.: "Progress in petroleum technonogy," No. 5 of "Advances in Chemistry," Am. Chem. Soc., Wash., D. C., page 77.